United States Patent
Patil et al.

(10) Patent No.: US 11,800,188 B2
(45) Date of Patent: Oct. 24, 2023

(54) SYSTEM AND METHOD OF CONTEXTUAL STANDBY OF SET TOP BOX

(71) Applicant: JIO PLATFORMS LIMITED, Ahmedabad (IN)

(72) Inventors: Vishal Shashikant Patil, Bengaluru (IN); Gulprit Singh, Bengaluru (IN)

(73) Assignee: Jio Platforms Limited, Gujarat (IN)

( * ) Notice: Subject to any disclaimer, the term of this patent is extended or adjusted under 35 U.S.C. 154(b) by 0 days.

(21) Appl. No.: 17/335,729

(22) Filed: Jun. 1, 2021

(65) Prior Publication Data

US 2021/0377601 A1 Dec. 2, 2021

(30) Foreign Application Priority Data

May 30, 2020 (IN) .............................. 202021022767

(51) Int. Cl.
| | |
|---|---|
| H04N 21/24 | (2011.01) |
| H04N 21/25 | (2011.01) |
| H04N 21/258 | (2011.01) |
| H04N 21/262 | (2011.01) |
| H04N 21/418 | (2011.01) |
| H04N 21/422 | (2011.01) |
| H04N 21/442 | (2011.01) |
| H04N 21/443 | (2011.01) |
| H04N 21/45 | (2011.01) |
| H04N 21/466 | (2011.01) |
| H04N 21/475 | (2011.01) |

(Continued)

(52) U.S. Cl.
CPC ....... *H04N 21/4436* (2013.01); *G06F 1/3206* (2013.01); *H04N 21/44218* (2013.01); *H04N 21/466* (2013.01)

(58) Field of Classification Search
None
See application file for complete search history.

(56) References Cited

U.S. PATENT DOCUMENTS 8,924,999 B1 * 12/2014 Santangelo ........ H04N 21/2668
725/9
9,100,694 B1 * 8/2015 Chandel ............. H04N 21/4661
(Continued)

FOREIGN PATENT DOCUMENTS

KR  20070013848  * 1/2007

*Primary Examiner* — Brian T Pendleton
*Assistant Examiner* — Jean D Saint Cyr
(74) *Attorney, Agent, or Firm* — Finnegan, Henderson, Farabow, Garrett & Dunner, LLP.

(57) ABSTRACT

A system and method for automatically controlling a mode on a set top box [100]. The method comprises identifying, from a set of pre-stored contextual information, a target pre-stored contextual information associated with an entity. The method further comprises identifying, a usage preference associated with the entity based on the target pre-stored contextual information. Thereafter the method leads to identifying, one of a presence and an absence of the entity in the vicinity of the set top box [100] based on the target pre-stored contextual information and a sensor data. The method thereafter comprises automatically controlling, the mode on the set top box [100] based on the usage preference associated with the entity and one of the presence and the absence of the entity in the vicinity of the set top box [100].

14 Claims, 5 Drawing Sheets

(51) Int. Cl.
*H04N 21/658* (2011.01)
*G06F 1/3206* (2019.01)

(56) References Cited

U.S. PATENT DOCUMENTS

2014/0047467 A1* 2/2014 Arling .............. H04N 21/44231
386/297
2015/0019953 A1* 1/2015 Freiman ............. H04N 21/4516
715/234

* cited by examiner

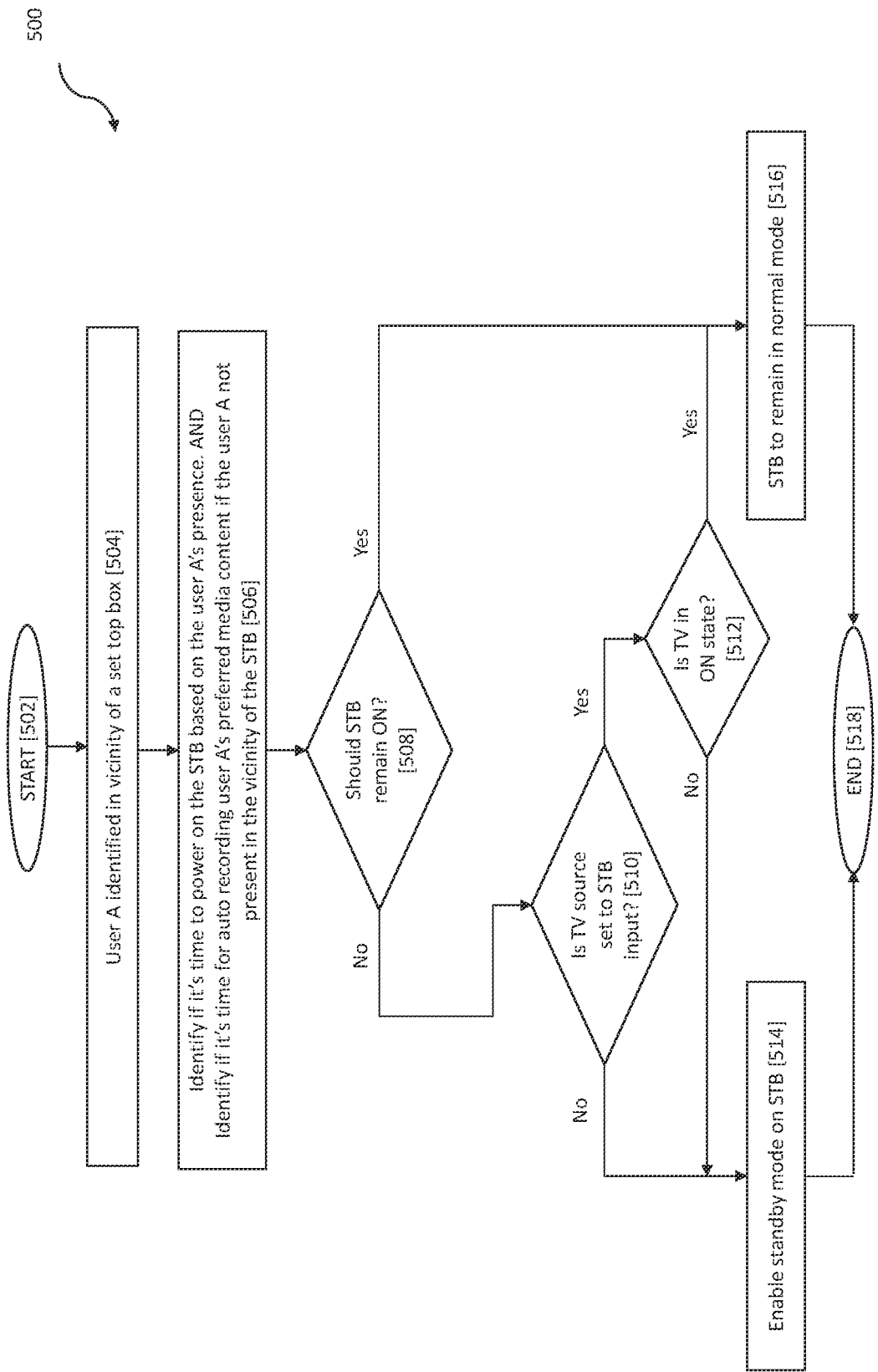

SYSTEM AND METHOD OF CONTEXTUAL STANDBY OF SET TOP BOX

TECHNICAL FIELD

The present invention generally relates to Set Top Box (STB) and more particularly, to systems and methods for automatically controlling a mode on a set top box based on a contextual and a senor information.

BACKGROUND OF THE DISCLOSURE

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

With an advancement in the digital and wireless technologies, the TV Set-Top Boxes (STBs) are also enhanced to a great extent. A STB may be defined as a computerized device that processes digital information and may come in many forms and can have a variety of functions such as Digital Media Adapters, Digital Media Receivers, Windows Media Extender and most video game consoles are also examples of the set-top boxes. The STB accepts commands from user/s (often via use of remote devices such as a remote control) and transmits these commands back to the network operator which has a return path capability for two-way communication. The STB device provides satellite broadband TV services, Video on Demand, games, etc. Currently, the type of TV Set-Top Box (STB) most widely used is one which receives encoded/compressed digital signals from a signal source (e.g., a content provider's headend) and decodes/decompresses those signals, converting them into analog signals compatible to an analog (SDTV) television. The STB also contains communication capabilities including, but not limited to, wireless communication capabilities provided by wireless networks such as LTE, Wi-Fi, Bluetooth, NB IoT, etc.

Wireless networks are widely deployed today to provide various communication services such as voice, video, data, advertisement, content, messaging, broadcasts, etc. The wireless networks usually comprises multiple access networks and support communications for multiple users by sharing the available network resources.

One example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 5 and beyond. Unlike HSPA, Long Term Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

The wireless communication networks also includes 5th generation mobile networks or 5th generation wireless systems, abbreviated 5G, the telecommunications standards beyond the current 4G LTE/international mobile telecommunications (IMT)-advanced standards. 5G aims at higher capacity than current 4G LTE, allowing a higher density of mobile broadband users, and supporting device-to-device, ultra-reliable, and massive machine communications. 5G also aims at lower latency than 4G equipment and lower battery consumption, for better implementation of the Internet of things (IoT) devices.

3GPP has also introduced Narrow Band Internet of things IoT (NB-IoT) technology in release 13. The low end IoT applications can be met with this technology. It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 KHz i.e. one PRB (Physical Resource Block) is allocated for this technology. The NB-IOT can be seen as a separate RAT (Radio Access Technology). The NB-IOT can be deployed in 3 modes as: "in-band", "guard band" and "standalone". In the "in-band" operation, resource blocks present within LTE carrier are used. There are specific resource blocks reserved for synchronization of LTE signals which are not used for NB-IOT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Furthermore, the Internet of Things (IoT) is a network of devices, vehicles, home appliances, and other items embedded with electronics, software, sensors, actuators, and connectivity which can be readable, recognizable, locatable, addressable, and controllable via an IoT communications network that enables these things to connect and exchange data, creating opportunities for more direct integration of the physical world into computer-based systems, resulting in efficiency improvements, economic benefits, and reduced human exertions. The "Internet of things" (IoT) concept getting more and more popular, devices, such as sensors, actuators and everyday objects including the coffee makers, washing machines, headphones, lamps and wearable devices, etc. are being increasingly looked upon as potential IoT devices. IoT involves extending internet connectivity beyond standard devices, such as desktops, laptops, smartphones and tablets, to any range of traditionally dumb or non-internet-enabled physical devices and everyday objects. Embedded with technology, these devices can communicate and interact over the communication networks, and they can be remotely monitored and controlled. The term "Enterprise IoT" refers to devices used in business and corporate settings in a network of physical objects that contain embedded technology to communicate and sense or interact with their internal states or the external environment. Here, IoT refers to connected physical devices, in many cases everyday objects (things) that can communicate their status, respond to events, or even act autonomously. This enables communication among those things, closing the gap between the real and the virtual world and creating smarter processes and structures that can support user without needing their attention. IoT has evolved from the convergence of wireless technologies, micro-electromechanical systems (MEMS), and the Internet. An IoT device is generally provisioned with an IP address to provide it with the capability of transferring data and receive control signals over an IP network using the standard Internet protocols such as TCP/IP or UDP which is being exclusively used in the Internet.

Further, the STBs may also have communication capabilities to connect to the smart computing devices. A 'smart computing device or user equipment (UE) or user device' refers to any electrical, electronic, electro-mechanical computing device or equipment or a combination of one or more of the above devices. Also, a 'smartphone' is one type of "smart computing device" that refers to a mobility wireless cellular connectivity device that allows end users to use services on cellular networks such as including but not limited to 2G, 3G, 4G, 5G and/or the like mobile broadband Internet connections with an advanced mobile operating system which combines features of a personal computer operating system with other features useful for mobile or handheld use. Also, a smart device may have one or the other type of a subscriber identity module (SIM) card to connect to a network.

Further, the set top boxes (STBs) via the above disclosed and the like communication capabilities receives and displays TV signals, connect to networks, play games via a game console, surf the Internet, interact with Interactive Program Guides (IPGs), virtual channels, electronic storefronts, walled gardens, sends e-mail, and videoconferences etc.. Many STBs are able to communicate in real time with devices such as camcorders, DVD and CD players, portable media devices and music keyboards. Some STB have large dedicated hard-drives and smart card slots to insert smart cards for purchases and identification. The customer uses the STB for entertainment purposes. The users typically watch specific contents on specific channels at specific time. The user has to remember the time and channel number for playing the content every time. Also, there is an option to record content as well, however, this optionally involves connecting STB with a dedicated external hard drive and explicitly recording the desired content.

Furthermore, over a period of time the STB device has gone on a major transformation in terms of processing and capabilities but one of the major challenges in STB hub based along with IoT platform deployments is different use cases and specific case of mode controls such as standby of STB based on the detection of person in the room. Most of the solutions rely on direct interaction for command to build the use cases which are static and closed model definition for enabling standby of STB. Also, currently there are no solution available for STB mode control through external/ internal sensors via complex machine learning techniques and data collected from external/internal sensors. For instance, some of the known solutions suggests for toggling STB between ON power mode and Stand By mode via detection based on operating signal of television set (e.g. (1) electricity supply passing through the power cord to the television set or (2) electric current passing through the power cord. Such solutions primarily talk about normal standby for STB for control upon power cable monitoring to TV.

Some other known solutions suggests about a remote control unit which has been inactive for a threshold period of time, the remote control may enter a power saving sleep mode during which only certain functions receive power. The Remote control may exit the power saving sleep mode upon activation of a remote control function by, for example, a user and/or set-top box. In this way, processing unit and the clock and/or counter may act as a power management system for remote control.

At present, there are no solutions to the existing problems as defined above for contextual control of STB modes along with the Gateway or to seamlessly provide different use cases without any disruption for services. In the current technology landscape there are no mechanism for contextual control of STB modes by determining at least a presence and/or an absence of person(s) in a room or by other present IoT or smart devices connected. Also, there are no solution that can contextually control the STB modes based on determination of internal and external sensors connected to STB directly or in-directly via a cloud computing platform to determine the presence/absence of a person in the vicinity of the STB.

The current landscape also fails to disclose elements for detection of a person/user by enabling the STB to connect to external smart sensors via wireless connectivity along with directly connected sensors and contextual information via a cloud computing platform that is based on previous user patterns to finally provide input to control the modes of the STB. Also, there are no solutions based on such detection indicating if a particular person/user is present or not based on usage pattern of specific users and external sensors/smart devices to further:

Automatically control the modes of the STB to at least power on and stream a specific serial/episode/movie/ digital content if the user is present in the house, OR Automatically control the modes of the STB at least to record the specific serial/episode/movie/digital content at said time if user is not present in the house.

Hence, there is a need for a novel system and method for automatically controlling a mode on a set top box based on a contextual and a senor information. More particularly, there is a need in the art for automatically controlling the mode on the set top box based at least on a detection of a presence or an absence of a user through all available sensors and a contextual information via a cloud computing platform that is based on previous user patterns.

The foregoing examples of the related art and limitations related therewith are intended to be illustrative and not exclusive. Other limitations of the related art will become apparent to those of skill in the art upon a reading of the specification and a study of the figures.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a system and method for automatically controlling a mode on a set top box based on a contextual and a senor information. Another object of the present invention is to provide a method and system for providing an input to facilitate a contextual control of a mode of the STB based on a detection of one of a presence and an absence a person/user in the vicinity of the STB, by enabling the STB to connect to external smart sensors via wireless connectivity along with directly connected sensors to detect presence and/or absence of a user through all available sensors and contextual information via cloud computing that is based on previous patterns like; time when user enters and leaves the house; data collected on remote control operations or to detect the possibility of user operating the remote control etc. Another object of the present invention is to provide a solution using contextual and sensor information, such that a standby mode can be smartly enabled on the STB to conserve power and/or smartly disabled to stream specific content, if the user is present in the house or automatically record specific content, at said time, when user is not present in the house. Also, an object of the present invention is to provide a solution that can automatically provide input to control the contextual standby of the STB to turn on and stream a specific serial/episode/movie if the user is present in the house. Another object of the present invention is to provide a solution that can automatically provide input to control the contextual standby of the STB to record a specific serial/episode/movie at said time if user is not present in the house. An object of the present invention is to provide solution for transformation a STB to Smart STB that contains communication capabilities including, but not limited to, Wi-Fi, Bluetooth, NB IoT, etc. Another object of the present invention is to provide a remote control device to provide input to control the mode(s) of the STB that includes multiple sensors including but not limited to a fingerprint sensor, to identify the operator whenever the STB is turned ON or OFF, Mic sensor to identify the voice of operator, accelerometer sensor, gyroscope sensor to detect movement of remote, etc. An object of the present invention is to provide a solution to provide a secure backend cloud infrastructure where all sensor information (internal and external) collected by the smart STB is securely stored, categorized and processed using complex Artificial Intelligence (AI) and machine learning (ML) techniques to derive patterns, user preference recognition, in order to further provide enhanced user experience to control the mode(s) of the STB. Another object of the present invention is to provide solution to upgrade the existing Set Top Boxes available in market that lack the capability to understand user requirement and preferences including contextual standby of STB. Another object of the present invention is to provide a solution to upgrade the current STB's dumb devices with capability to stream digital signal based on a person's presence and preference to provide input to control the modes such as contextual standby of the STB. Also, an object of the present invention is to provide a mechanism that provides a seamless enhancement of existing Set Top Boxes for precision and decision services in the user devices independent of whether the STB and the IoT is on 5G/4G/3G/EV-Do/eHRPD capable technology. Another object of the present invention is to add value to user for content services and deliver interactive advertisements during the ON settings of STB with understanding from command of the contextual standby of the STB. Yet another object of the present invention is to add value with input rich information and technology rich digital content, serving dual purpose of enhancing user experience with low input cost and reducing ecological burden of adding additional devices for such functionality to provide input to control mode(s) of the STB.

In order to achieve the aforementioned objectives, the present invention provides a method and system for automatically controlling a mode on a set top box.

An aspect of the present invention relates to a method for automatically controlling a mode on a set top box. The method comprises identifying, by an identification unit of the set top box from a set of pre-stored contextual information, a target pre-stored contextual information associated with an entity. The method further comprises identifying, by the identification unit of the set top box, a usage preference associated with the entity based on the target pre-stored contextual information. Thereafter the method leads to identifying, by the identification unit of the set top box, one of a presence and an absence of the entity in the vicinity of the set top box based on the target pre-stored contextual information and a sensor data. The method thereafter comprises automatically controlling, by a processing unit of the set top box, the mode on the set top box based on the usage preference associated with the entity and one of the presence and the absence of the entity in the vicinity of the set top box.

Another aspect of the present invention relates to a system i.e. a set top box for automatically controlling a mode on a set top box. The system comprises an identification unit, configured to identify, from a set of pre-stored contextual information, a target pre-stored contextual information associated with an entity. The identification unit is further configured to identify, a usage preference associated with the entity based on the target pre-stored contextual information. Further, the identification unit is configured to identify, one of a presence and an absence of the entity in the vicinity of a set top box based on the target pre-stored contextual information and a sensor data. Also, the system further comprises a processing unit, configured to automatically control, the mode on the set top box based on the usage preference associated with the entity and one of the presence and the absence of the entity in the vicinity of the set top box.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 5 illustrates an exemplary flow diagram, depicting an instance implementation of an exemplary process of automatically controlling a standby mode on a set top box, in accordance with exemplary embodiments of the present invention.

Figure 1:
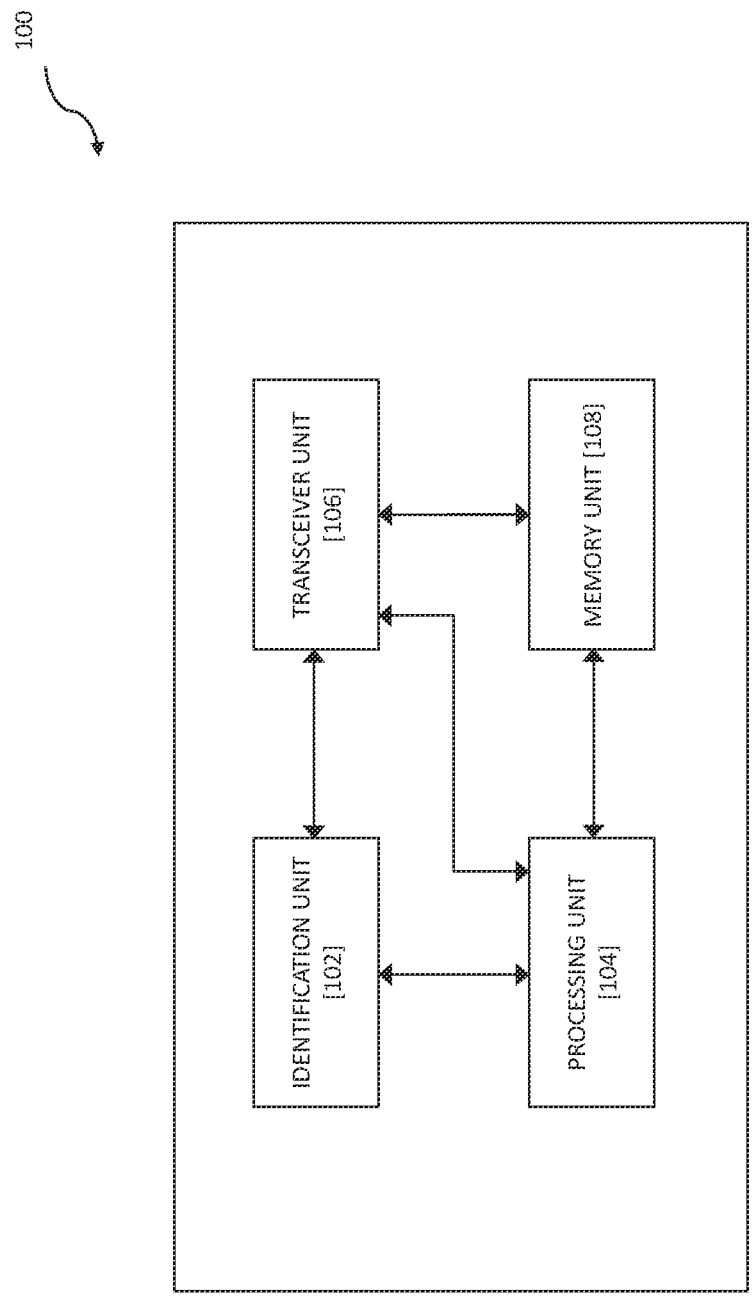
FIG. 1 illustrates an exemplary block diagram of a set top box/system [100] for automatically controlling a mode on a set top box, in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

The terms "reading" and "read" as used herein mean a process or processes that serve to recover data that has been added to, encoded in, combined with or embedded in, media data.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The terms "first", "second", "primary" and "secondary" are used to distinguish one element, set, data, object, step, process, function, activity or thing from another, and are not used to designate relative position, or arrangement in time or relative importance, unless otherwise stated explicitly. The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

Moreover, terms like "user equipment" (UE), "electronic device", "mobile station", "user device", "mobile subscriber station," "access terminal," "terminal," "smartphone," "smart computing device," "handset," and similar terminology refers to any electrical, electronic, electro-mechanical equipment or a combination of one or more of the above devices. Smart computing devices may include, but not limited to, a mobile phone, smart phone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user configured, computer networked device that can operate autonomously. A smart computing device is one of the appropriate systems for storing data and other private/sensitive information. The said device operates at all the seven levels of ISO reference model, but the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G and the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices. Furthermore, the foregoing terms are utilized interchangeably in the subject specification and related drawings.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. Furthermore, the term "processor" as used herein includes, but is not limited to one or more computers, hardwired circuits, signal modifying devices and systems, devices and machines for controlling systems, central processing units, programmable devices and systems, systems on a chip, systems comprised of discrete elements and/or circuits, state machines, virtual machines, data processors, processing facilities and combinations of any of the foregoing. The processor may perform signal coding data processing, input/output processing, and/or any other functionality that enables the working of the system according to the present disclosure. More specifically, the processor or processing unit is a hardware processor. The term "processor" as used herein means processing devices, apparatus, programs, circuits, components, systems and subsystems, whether implemented in hardware, tangibly-embodied software or both, and whether or not programmable.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The memory unit as used herein is configured to retain data, whether on a temporary or permanent basis, and to provide such retained data to various units to perform their respective functions.

As used herein the "Transceiver Unit" may include but not limited to a transmitter to transmit data to one or more destinations and a receiver to receive data from one or more sources. Further, the Transceiver Unit may include any other similar unit obvious to a person skilled in the art, to implement the features of the present invention. The transceiver unit may convert data or information to signals and vice versa for the purpose of transmitting and receiving respectively.

As disclosed in the background section, the existing technologies have many limitations and in order to overcome at least some of the limitations of the prior known solutions, the present disclosure provides a solution for automatically controlling a mode on a set top box. The present invention in order to automatically controlling the mode on the set top box encompasses use of a contextual and a senor information. More particularly, the present invention encompasses identifying a specific entity in vicinity of the set top box and a usage preference associated with the specific entity based on at least one of the contextual and the senor information. The specific entity may include but not limited to a specific user, IOT device, pet etc. In the present invention the specific entity is explained with respect to a specific person/user, but the same is not limited to a person or a user or a human object. More specifically, for the purposes of illustration only, the present disclosure in some examples or implementations has been discussed with reference to identifying a specific user. However, the scope of the disclosure is not limited to identification of a specific user but encompasses identifying any entity as described above. Also, in the present invention data such as contextual information associated with a user, user device data, sensor data etc. is collected based on prior consent provided by such user. Further, such information is a non-personal information. The vicinity of the set top box may refer to a surrounding area of a specific area where the set top box and/or a display device such as TV connected to the set top box is placed. More specifically, the vicinity of the set top box may be an area up to which the set top box and/or the display device connected to the set top box is clearly visible/accessible to the user to watch a program/event/live stream/digital content via the set top box. Also, to implement the features of the present invention, in an implementation, the set top box is connected to one or more display devices such as Televisions (TV), user device/s, Remote-Control Unit (RCU) and other devices including but not limited to IoTs, sensor devices/sensors such as CCTV, Smart bulb, Thermostat, Smartphone, Fitness Band, Smart door-lock etc. Also, the STB is connected to one or more secure cloud computing backend/cloud storage units for data processing and storing.

The smart Set-Top-Box/Set-Top-Box receives, decodes and displays digital signals and also supports IP TV, gaming, etc. The smart STB/STB have multiple communication interfaces like IR, Bluetooth, BLE, Wi-Fi, NFC, Cloud etc. through which it connects to external devices and/or sensors within/outside a building including, but not limited to, thermostat, smart door lock, remote-control units, smart bulbs, smartphones, home surveillance systems, home automation systems, fitness band, etc. The Remote-control unit (RCU) connects to the STB including the sensors like accelerometer, gyroscope, fingerprint, mic etc. via IR (Infra-Red), BLE (Bluetooth Low Energy) or any other communication mechanism that is able to transmit sensor data. The secure backend cloud infrastructure connected to the STB securely stores all sensor information (i.e. internal and external sensor data) collected by the STB, to further categorize and process the stored sensor information using complex Artificial Intelligence (AI) and machine learning (ML) techniques to derive patterns and user preference recognition in order to further provide better user experience.

In order to automatically control the mode on the set top box (such as a STB contextual standby) based on detection of a usage preference associated with an entity and a presence or an absence of the entity (i.e. at least one of a user and IoTs with Cloud Platform), the set top box/system as disclosed in the present invention is configured to connect to the various devices and/or sensors such as including but not limited to user device(s), remote control unit(s), storage unit(s) (such as a cloud storage unit), accelerometer(s), gyroscope(s), microphone(s), camera sensor(s), temperature sensor(s), infrared sensor(s), humidity sensor(s) and the like. Further, once all the connections are established, the present invention encompasses performing one or more operations to identify one of the presence and the absence of the entity in the vicinity of the set top box, based at least on at least one of a pre-stored contextual information received from a cloud storage unit and a sensor data of received from the connected sensors. Also, the present invention encompasses identifying the usage preference associated with the entity based at least on the pre-stored contextual information received from the cloud storage unit. Thereafter, the present invention encompasses automatically controlling the mode on the set top box based on the usage preference associated with the entity and one of the presence and the absence of the entity in the vicinity of the set top box.

Hereinafter, exemplary embodiments of the present disclosure will be described in detail with reference to the accompanying drawings so that those skilled in the art can easily carry out the present disclosure.

Referring to FIG. 1, an exemplary block diagram of a set top box/system [100] for automatically controlling a mode on the set top box, in accordance with exemplary embodiments of the present invention is shown.

The system i.e. the set top box [100] comprises, at least one identification unit [102], at least one processing unit [104], at least one transceiver unit [106] and at least one memory unit [108]. Also, all of the components/units of the set top box [100] are assumed to be connected to each other unless otherwise indicated below. Also, in FIG. 1 only a few units are shown, however, the set top box [100] may comprise multiple such units or the set top box [100] may comprise any such numbers of said units, as required to implement the features of the present disclosure.

The system/set top box [100], is configured to automatically control the mode on the set top box [100], with the help of the interconnection between its components/units. Also, the mode is one of a standby mode, a sleep mode, a Power off mode, a Power on mode and a low Power mode.

In order to automatically control the mode on the set top box [100], the transceiver unit [106] is configured to initiate a connection between the set top box [100] and at least one of one or more user devices, one or more sensors and one or more storage units. In an implementation the one or more user devices are connected to the set top box [100] via at least one of a wired and a wireless connection. Also, the one or more sensors comprises one or more internal sensors of the set top box [100] and/or one or more externally connected sensors of the set top box [100]. In an implementation the one or more sensors may also include sensor/s present in at least one of a remote control unit (RCU) and a smart device (such as a smartwatch, a smartphone, a smart AC, a smart bulb, a smart speaker, a smart fan and the like) connected to the set top box [100]. More particularly, in an example the one or more sensors may include but not limited to one or more smart door-lock sensors, smart bulb sensors, motion sensors, camera sensors, thermostat sensors, microphone sensors, thermal sensors, pressure sensors, infrared sensors, humidity sensors, proximity sensors, light sensors, position sensors, radiation sensors and other sensors present in a smartphone, a smart/fitness watch, a smart TV and/or the like smart/IoT devices connected to the set top box [100]. The one or more sensors are connected to the set top box via one or more communication interfaces such as IR (infrared), Bluetooth, BLE, Wi-Fi, NFC, Cloud etc.

Further, in an implementation, the one or more storage units comprises one or more cloud/remote storage units and the one or more cloud/remote storage units are connected to at least one of the one or more sensors, the one or more user devices and the set top box [100] via one or more wireless communication mediums. In an implementation the one or more cloud storage unit may also connected to the one or more memory unit [108] of the set top box [100] via the transceiver unit [106]. Also, the one or more cloud storage units are configured to store at least a contextual information related to one or more entities associated with the one or more user devices, wherein an entity of the one or more entities comprises at least, at least one of a user and an IoT device associated with the one or more user devices. Also, the contextual information related to the one or more entities comprises one or more pattern of usage associated with the one or more entities, one or more usage preference associated with the one or more entities and such other contextual information associated with the one or more entities. In an implementation, a pattern of usage associated with the one or more entities may refer to a pattern followed by one or more users/entities to perform certain tasks, for example if a user A watches a TV show ABC around 5:00 PM on Monday to Friday, then the pattern of usage may indicate playing such TV show ABC around 5:00 PM on Monday to Friday by the user A. Further in an implementation, a usage preference associated with the one or more entities may refer to a specific program/event/live stream/digital content preferred by the one or more entities. For instance, in the above example, the TV show ABC will be referred as the usage preference associated with the User A, as the User A prefers to watch the TV show ABC on Monday to Friday around 5:00 PM.

Also, in an implementation, the one or more cloud storage units are configured to securely store, categorize and/or process at least, at least one of a sensor data (i.e. a data received via the one or more sensors) and a user data (i.e. a data received by the one or more user devices) based on a pre-trained data set to determine the contextual information related to the one or more entities (such as a contextual information related to one or more users of the one or more user devices). The pre-trained data set comprises a plurality of users' pattern of usage, a plurality of users' usage preferences and such similar data. Considering the above example where the user A watches the TV show ABC around 5:00 PM on Monday to Friday, a contextual information related to the user A may be determined based at least on a senor/user data indicating information of at least one of a Power on state of a TV around 5:00 PM on Monday to Friday, a streaming of the TV show ABC on said TV during said Power on state of the TV, a Power on state of a set top box connected to said TV around 5:00 PM on Monday to Friday, a Power on state of an AC in a room where the TV and the set top box is present around 5:00 PM on Monday to Friday, a camera frame indicating presence of said user A near the TV around 5:00 PM on Monday to Friday etc. and the pre-trained data set.

Once the set top box [100] is connected to at least one of the one or more user devices, the one or more sensors and the one or more storage units, the transceiver unit [106] of the set top box [100] is configured to receive, a set of pre-stored contextual information associated with a set of entities, from one or more storage units connected to the system/set top box [100]. The set of pre-stored contextual information comprises a contextual information associated with the set of entities. More particularly, the set of pre-stored contextual information comprises at least one of a pattern of usage associated with the set of entities and a usage preference associated with the set of entities and the set of pre-stored contextual information is generated at the one or more storage units based at least on the sensor data received at the one or more storage units using at least one of one or more Artificial Intelligence and one or more machine learning techniques. Furthermore, in an implementation, the contextual information associated with the set of entities includes but not limited to at least one of a user pattern/usage pattern/pattern of usage related to a user activity associated with the set of entities and a usage preference associated with the set of entities. In an example, the pattern of usage associated with the set of entities may include but not limited to a time one or more users usually reaches office, a time the one or more users usually Power on a particular AC or FAN or Light, a streaming of one or more specific digital programs, channels and/or media application the one or more users usually watches on a user device of the one or more users, a time the one or more users usually watches a display device connected to the set top box [100] and other such usage pattern related to various user activities associated with the set of entities monitored via at least one of the one or more sensors, the one or more IoT devices and/or the one or more user devices. Also, in an example the usage preference associated with the set of entities may include but not limited to a specific program/event/live stream/digital content preferred by the set of entities. Also, in an implementation at the one or more cloud storage units, via a processing unit is configured to categorize and/or process the data received from at least one of the one or more sensors, the one or more IoT devices and/or the one or more user devices using AI and ML techniques to derive the contextual information (such as user patterns, user preferences and the like) associated with the set of entities such the one or more users of one or more user devices.

Further, the transceiver unit [106] is also configured to receive, the sensor data, from one or more sensors connected to the system/set top box [100]. The sensor data provides an information related to at least one of at least one activity performed by the one or more entities, one of a presence and an absence of the one or more entities in an area such as in the vicinity of the set top box and the like information. In an example, the sensor data may include but not limited to a data received from at least one of a temperature sensor, a proximity sensor, an infrared sensor, a humidity sensor, a smart door lock sensor, a microphone sensor, a camera sensor, a smart bulb sensor, a smart AC sensor, a smart TV sensor, a smart remote control unit comprising various sensors, a motion sensor, a pressure sensor and the like sensors/sensor devices.

Also, the transceiver unit [106] is configured to receive, the user data from the one or more user devices. The user data provides at least an information related to at least one of at least one activity performed by one or more users on the one or more user devices and an information collected by one or more sensors of the one or more user devices.

The identification unit [102] is configured to identify, from the set of pre-stored contextual information, a target pre-stored contextual information associated with an entity, wherein said entity includes but not limited to at least one of a particular user and a particular IoT device associated with the one or more user devices connected to the set top box [100]. For example, if a set of pre-stored contextual information encompasses a contextual information of 10 users, then the identification unit [106] is configured to identify a target contextual information from the contextual information of said 10 users, wherein such target contextual information is associated with one of a specific user from the 10 users.

The target contextual information comprises at least one of a usage preference associated with the entity and a pattern of usage associated with the entity. The identification unit [102] is further configured to identify, the pattern of usage associated with the entity based on an identification of the entity, wherein the identification of the entity is based on at least one of the sensor data, a data received from a user device associated with the entity and a data associated with a pre-stored profile associated with the entity. For example, if a set of pre-stored contextual information comprising a contextual information of 5 entities is received at the set top box [100] via the transceiver unit [106], in such scenario the identification unit [102] is configured to identify an entity from the 5 entities (i.e. at least one of a specific user and a specific IoT device from the 5 entities) based on at least one of a sensor data (for example a camera sensor or mic sensor indicating a presence of the specific user and/or the specific IoT device), a data received from a user device associated with the entity (for example a connectivity details between a user device associated with the specific user and/or the specific IoT device with the set top box [100]) and a data associated with a pre-stored profile associated with the entity (for instance a user profile of the specific user and/or the specific IoT device stored at the memory unit [108]). Once the entity from the 5 entities is identified, a contextual information of said entity (i.e. the target contextual information) is identified from the set of pre-stored contextual information comprising the contextual information of 5 entities. Furthermore, the contextual information of said entity (i.e. the target contextual information) is identified based on identifying by the identification unit [102], a pattern of usage associated with said entity. In an instance, said pattern of usage may be identified as a pattern followed by said entity to perform certain tasks, for example if said entity initiates a streaming of a show at 4:00 PM daily, then the pattern of usage may indicate such initiation of streaming of said show around 4:00 PM daily by said entity.

The identification unit [102] is further configured to identify, the usage preference associated with the entity based on the target pre-stored contextual information. In an implementation, the usage preference associated with the entity (i.e. at least one of the particular user and the particular IoT device) may include but not limited to a specific program/event/live stream/digital content preferred by the entity. Considering the above example where the entity initiates a streaming of a show at 4:00 PM daily, in the given example, the identification unit [102] is configured to identify said show as a usage preference as said show is preferred by the entity.

Further the identification unit [102] is configured to identify, one of a presence and an absence of the entity (i.e. at least one of the particular user and the particular IoT device) in the vicinity of the set top box [100] based on the target pre-stored contextual information and the sensor data. The vicinity of the set top box may refer to a surrounding area of a specific area where the set top box [100] and/or a display device such as TV connected to the set top box [100] is placed. More specifically, the vicinity of the set top box [100] may be an area up to which the set top box [100] and/or the display device connected to the set top box [100] is clearly visible/accessible to the entity to access a program/event/live stream/digital content via the set top box [100]. Also in an example, if a target contextual information of a user A is identified and a sensor data is received, the identification unit [102] is configured to identify one of a presence and an absence of the user A in the vicinity of a set top box [100] based on the target contextual information of the user A and the sensor data. More particularly, if the target contextual information of the user A indicates that the user A in between 4:00 PM to 5:00 PM usually present in a room where the set top box [100] is placed, and the sensor data from one or more sensors indicates more than one users are present in said room between 4:00 PM to 5:00 PM, the identification unit [102] in such instance identifies one of the presence and the absence of the user A in said room based on the target contextual information of the user A and the sensor data of various sensors.

The processing unit [104] is configured to detect, a streaming time of a preferred event based on the usage preference associated with the entity. More particularly, the processing unit [104] is configured to detect whether a current time is a time of streaming of the preferred event identified based on the usage preference associated with the entity. Once the presence or the absence of the entity (i.e. at least one of the particular user and the particular IoT device) in the vicinity of the set top box [100] is identified, the processing unit [104] is configured to detect, a streaming time of an event preferred by said entity based on the usage preference associated with the entity, to further detect whether a current time is a time of streaming of such preferred event. For example, if a particular person prefers to watch a TV show ABC at 5:00 PM on Monday, the processing unit [104] is configured to detect, a streaming time of said TV show ABC i.e. 5:00 PM on Monday, to further detect whether a current time is a time of streaming of such preferred event (i.e. Monday, 5:00 PM).

The processing unit [104] is further configured to automatically control, the mode on the set top box [100] based on the usage preference associated with the entity and one of the presence and the absence of the entity in the vicinity of the set top box [100]. More particularly, the processing unit [104] is configured to automatically control, the mode on the set top box [100] based on the detected streaming time of the preferred event associated with the entity and one of the presence and the absence of the entity in the vicinity of the set top box.

Further, in an implementation the processing unit [104] to control the mode on the set top box [100] is further configured to perform one of a function of automatically disabling the standby mode on the set top box [100] based on a successful detection of the streaming time of the preferred event and the presence of the entity in the vicinity of the set top box [100], automatically disabling the standby mode on the set top box [100] based on the successful detection of the streaming time of the preferred event and the absence of the entity in the vicinity of the set top box [100], automatically enabling the standby mode on the set top box based on an unsuccessful detection of the streaming time of the preferred event and the presence of the entity in the vicinity of the set top box [100], and automatically enabling the standby mode on the set top box [100] based on the unsuccessful detection of the streaming time of the preferred event and the absence of the entity in the vicinity of the set top box [100].

Furthermore, the function of automatically enabling the standby mode on the set top box [100] based on the unsuccessful detection of the streaming time of the preferred event and the presence of the entity in the vicinity of the set top box [100] is further based on a detection of a power off state of a TV connected to the set top box. More particularly, in the given scenario, a power on/off state of the TV connected to the set top box [100] is determined to identify an event where the entity is currently watching/accessing any program/media content/digital event/live event over the TV via the set top box [100] (i.e. in case the TV is in Power on state), in order to further disable the standby mode on the set top box [100] or to keep the set top box [100] in On state; OR the power on/off state of the TV connected to the set top box [100] is determined to identify an event where the entity currently not watching/accessing any program/media content/digital event/live event over the TV via the set top box [100] (i.e. in case the TV is in Power Off state), in order to further enable the standby mode on the set top box [100].

Also, in an implementation the function of automatically enabling the standby mode on the set top box [100] based on the unsuccessful detection of the streaming time of the preferred event and the presence of the entity in the vicinity of the set top box [100] is further based on a detection of an ongoing display of a digital content on the TV via an input source other than the set top box. More particularly, in the given scenario, the ongoing display of the digital content on the TV via the input source other than the set top box [100] is determined to identify an event where the entity is currently watching/accessing the digital content over the TV via the input source other than the set top box [100], in order to further enable the standby mode on the set top box [100] or to keep the set top box [100] in the standby state. Also, in an implementation the input source other than the set top box [100] may include but not limited to a smart speaker, a smartphone, a smart TV, a USB device or any such similar device having a capability to provide as an input source the digital content(s) over the TV.

Therefore, in an example, the processing unit [104] will perform the function of automatically disabling the standby mode on the set top box [100], if a particular user 1 is identified in the vicinity of the set top box [100] and if a current time is a streaming time of an event preferred by said particular user 1. In the given example, the standby mode on the set top box [100] is disabled to automatically display said preferred event associated with user 1 via one or more display devices such as a TV connected to the set top box [100].

Also, in an example, the processing unit [104] will perform the function of automatically disabling the standby mode on the set top box [100], if a particular user 1 is not identified in the vicinity of the set top box [100] and if a current time is a streaming time of an event preferred by said particular user 1. In the given example, the standby mode on the set top box [100] is disabled to automatically record said preferred event associated with user 1 via the set top box [100].

Further, in an example, the processing unit [104] will perform the function of automatically enabling the standby mode on the set top box [100], if a particular user 1 is identified in the vicinity of the set top box [100] and if a current time is not the streaming time of an event preferred by said particular user 1. Also, said function of automatically enabling the standby mode on the set top box [100] based on the unsuccessful detection of the streaming time (i.e. the current time as the streaming time) of the preferred event and the presence of the particular user 1 in the vicinity of the set top box [100] is further based on a detection of a power off state of a TV connected to the set top box [100]. The power off state of the TV connected to the set top box [100] is determined to further identify that the particular user 1 is currently not watching/accessing any program/media content/digital event/live event over the TV via the set top box [100].

Also, in an example, the processing unit [104] will perform the function of automatically enabling the standby mode on the set top box [100], if a particular user 1 is not identified in the vicinity of the set top box [100] and if a current time is not the streaming time of an event preferred by said particular user 1.

Therefore, based on the implementation of the features of the present invention, the system i.e. the set top box [100] is configured to automatically control a mode on the set top box [100], irrespective of an initial mode/state of the set top box [100] such as a Power on state, Power Off state, Standby state or low power state etc. The solution as disclosed in the present invention provides a seamless automatic transition of the set top box [100] from a current working mode/state to other mode/state based on the usage preference associated with an entity and one of the presence and the absence of said entity in the vicinity of the set top box [100].

Figure 2:
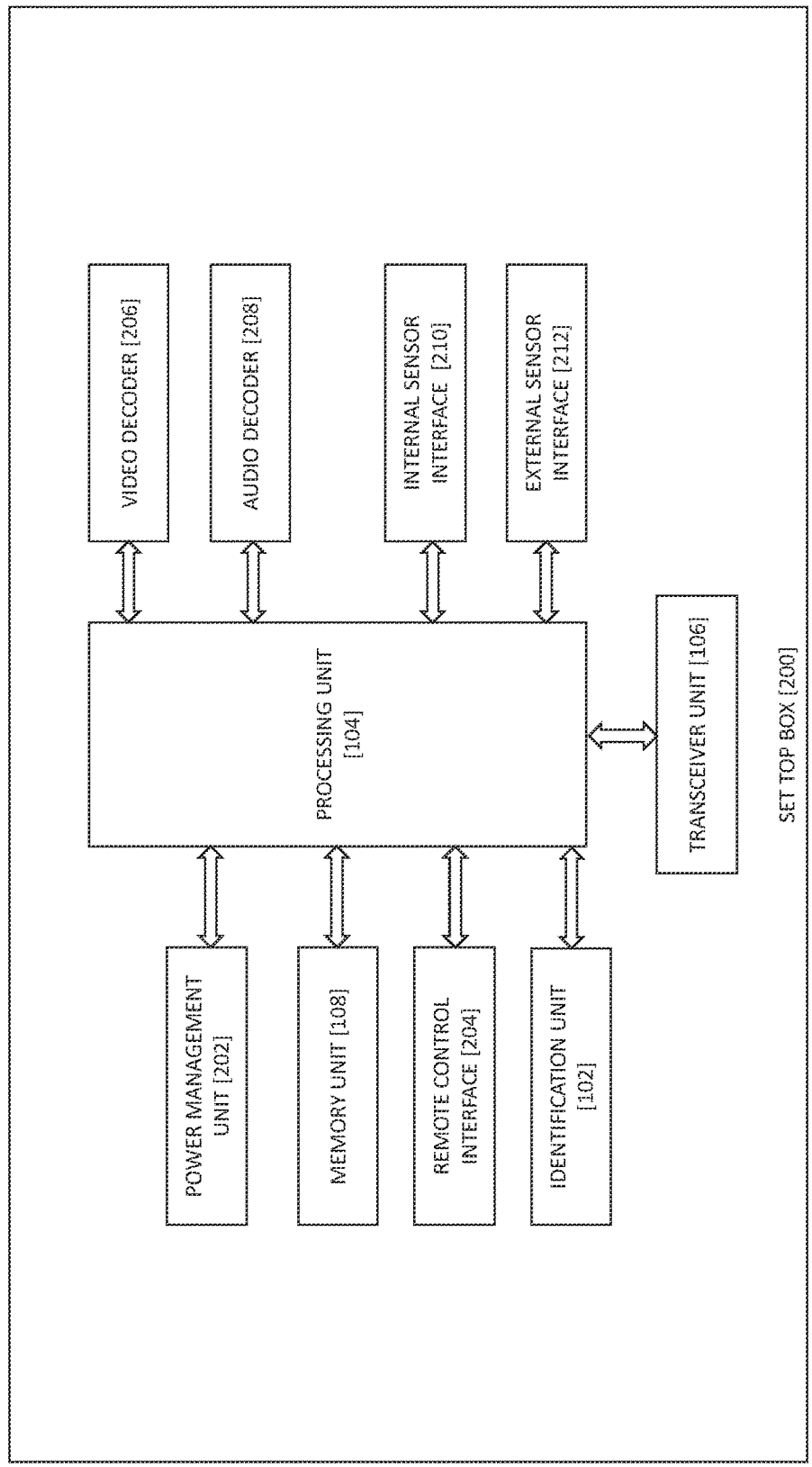
FIG. 2 illustrates an exemplary diagram of a set top box [200], in accordance with exemplary embodiments of the present invention.

Referring to FIG. 2, an exemplary diagram of a set top box [200], in accordance with exemplary embodiments of the present invention is shown. The set top box [200] as indicated in the FIG. 2, depicts units/components additional to units/components disclosed in the FIG. 1.

More particularly, as shown in FIG. 2, the set top box [200] comprises, at least one identification unit [102], at least one processing unit [104], at least one transceiver unit [106], at least one memory unit [108], at least one power management unit [202], at least one remote control interface [204], at least one video decoder [206], at least one audio decoder [208], at least internal sensor interface [210] and at least one external sensor interface [212]. All of the components/units of the set top box [200] are assumed to be connected to each other unless otherwise indicated below. Also, in FIG. 2 only a few units are shown, however, the set top box [200] may comprise multiple such units or the set top box [200] may comprise any such numbers of said units, as required to implement the features of the present disclosure. The set top box [200] is configured to automatically control a mode on the set top box [200], with the help of the interconnection between its components/units.

Furthermore, the power management unit [202] is configured to manage a power source or a power on/off state of the units/components of the set top box [200]. Also, the remote control interface [204] is configured to provide an interface to remotely connect the set top box [200] with one or more remote devices/sensors. The video decoder [206] and the audio decoder [208] are configured to decode an encoded video and audio digital contents respectively, to stream at least one digital content via the set top box [200]. Further, internal sensor interface [210] and the external sensor interface [212] are configured to provide an interface to connect to the one or more internal sensor and one or more external sensors respectively, with the set top box [200].

Further, the identification unit [102], the processing unit [104], the transceiver unit [106] and the memory unit [108] of the set top box [200] are configured to operate in a similar manner as disclosed above in FIG. 1, to implement the features of the present invention.

Figure 3:
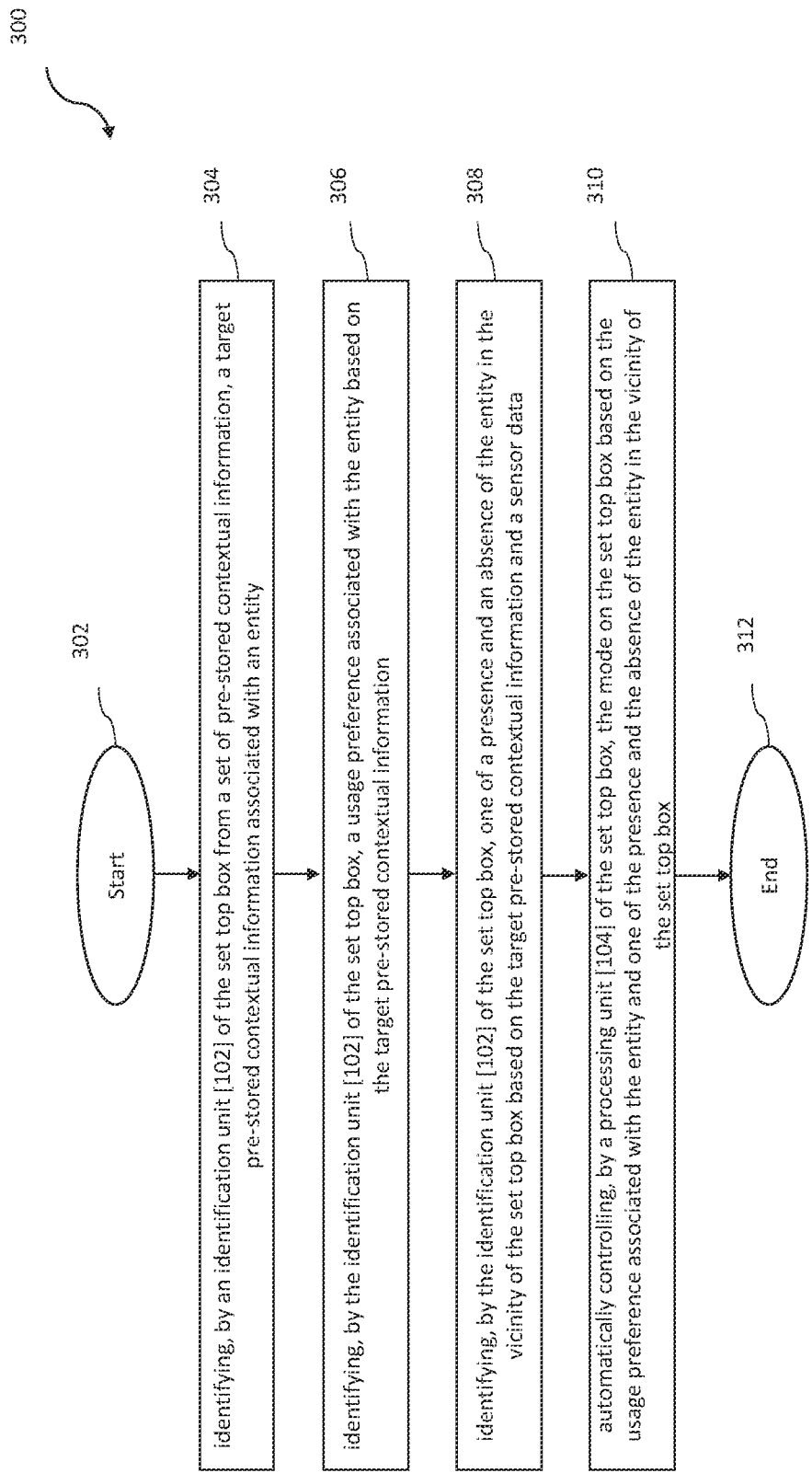
FIG. 3 illustrates an exemplary method flow diagram [300], depicting a method for automatically controlling a mode on a set top box, in accordance with exemplary embodiments of the present invention.

Referring to FIG. 3, an exemplary method flow diagram [300], depicting a method for automatically controlling a mode on a set top box [100], in accordance with exemplary embodiments of the present invention is shown. As shown in FIG. 3, the method starts at step [302].

In order to automatically control the mode on the set top box [100], the method encompasses initiating by a transceiver unit [106] of the set top box [100], a connection between the set top box [100] and at least one of one or more user devices, one or more sensors and one or more storage units. The mode is one of a standby mode, a sleep mode, a Power off mode, a Power on mode and a low Power mode. In an implementation the one or more user devices are connected to the set top box [100] via at least one of a wired and a wireless connection. Also, the one or more sensors comprises one or more internal sensors of the set top box [100] and/or one or more externally connected sensors of the set top box [100]. In an implementation the one or more sensors may also include sensor/s present in at least one of a remote control unit (RCU) and a smart device (such as a smartwatch, a smartphone, a smart AC, a smart bulb, a smart speaker, a smart fan, a smart fitness band and the like) connected to the set top box [100]. More particularly, in an example the one or more sensors may include but not limited to one or more smart door-lock sensors, smart bulb sensors, motion sensors, camera sensors, thermostat sensors, microphone sensors, thermal sensors, pressure sensors, infrared sensors, humidity sensors, proximity sensors, light sensors, position sensors, radiation sensors and other sensors present in a smartphone, a smart/fitness watch, a smart TV and/or the like smart/IoT devices connected to the set top box [100]. The one or more sensors are connected to the set top box via one or more communication interfaces such as IR (infrared), Bluetooth, BLE, Wi-Fi, NFC, Cloud etc.

Further, in an implementation, the one or more storage units comprises one or more cloud/remote storage units and said one or more storage units are connected to at least one of the one or more sensors, the one or more user devices and the set top box [100] via one or more wireless communication mediums. In an implementation the one or more storage unit may also connected to one or more memory unit [108] of the set top box [100] via the transceiver unit [106]. Also, the method encompasses storing at the one or more cloud storage units/storage units at least a contextual information related to one or more entities associated with the one or more user devices, wherein an entity of the one or more entities comprises at least, at least one of a user and an IoT device associated with the one or more user devices. Also, the contextual information related to the one or more entities comprises one or more pattern of usage associated with the one or more entities, one or more usage preference associated with the one or more entities and such other contextual information associated with the one or more entities. In an implementation, a pattern of usage associated with the one or more entities may refer to a pattern followed by the one or more entities to perform certain tasks, for example if a user 1 plays a Video game CBA around 7:00 PM on every Sunday, then the pattern of usage may indicate playing such Video game CBA around 7:00 PM on every Sunday by the user 1. Further in an implementation, a usage preference associated with the one or more entities may refer to a specific program/event/live stream/digital content preferred by the one or more entities. For instance, in the above example, the Video game CBA will be referred as the usage preference associated with the User 1, as the User 1 prefers to play the Video game CBA on every Sunday around 7:00 PM.

Also, in an implementation, the method encompasses securely storing, categorising and/or processing at the one or more cloud storage units/storage units, at least, at least one of a sensor data (i.e. a data received via the one or more sensors) and a user data (i.e. a data received by the one or more user devices) based on a pre-trained data set to determine the contextual information related to the one or more entities (such as a contextual information related to one or more users of the one or more user devices). The pre-trained data set comprises a plurality of users' pattern of usage, a plurality of users' usage preferences and such similar data. Considering the above example where the user 1 plays the Video game CBA around 7:00 PM on every Sunday, a contextual information related to the user 1 may be determined based at least on a senor/user data indicating information of at least one of a Power on state of a gaming device around 7:00 PM on Sunday, a streaming of the Video game CBA on said gaming device during said Power on state of the gaming device, a Power on state of a set top box connected to said gaming device around 7:00 PM on Sunday, a Power on state of an AC in a room where the gaming device and the set top box is present around 7:00 PM on Sunday, a camera frame indicating presence of said user 1 near the gaming device around 7:00 PM on Sunday etc. and the pre-trained data set.

Once the set top box [100] is connected to at least one of the one or more user devices, the one or more sensors and the one or more storage units, the method comprises receiving at a transceiver unit [106] of the set top box [100], a set of pre-stored contextual information associated with a set of entities, from one or more storage units connected to the set top box [100]. The set of pre-stored contextual information comprises a contextual information associated with the set of entities. More particularly, the set of pre-stored contextual information comprises at least one of a pattern of usage associated with the set of entities and a usage preference associated with the set of entities and the set of pre-stored contextual information is generated at the one or more storage units based at least on the sensor data received at the one or more storage units using at least one of one or more Artificial Intelligence and one or more machine learning techniques. Furthermore, in an implementation, the contextual information associated with the set of entities includes but not limited to at least one of a user pattern/usage pattern/pattern of usage related to a user activity associated with the set of entities and a usage preference associated with the set of entities. In an example, the pattern of usage associated with the set of entities may include but not limited to a time one or more users usually reaches home, a time the one or more users usually connects a user device to a particular Wi-Fi connection, a streaming of one or more specific digital programs, channels and/or media application the one or more users usually watches on the user device of the one or more users, a time the one or more users usually watches a display device connected to the set top box [100] and other such usage pattern related to various user activities associated with the set of entities monitored via at least one of the one or more sensors, the one or more IoT devices and/or the one or more user devices. Also, in an example the usage preference associated with the set of entities may include but not limited to a specific program/event/live stream/digital content preferred by the set of entities. Also, in an implementation the method encompasses categorising and/or processing at the one or more cloud storage units, via a processing unit, the data received from at least one of the one or more sensors, the one or more IoT devices and/or the one or more user devices using AI and ML techniques to derive the contextual information (such as user patterns, user preferences and the like) associated with the set of entities.

The method further encompasses receiving at the transceiver unit [106] of the set top box [100], the sensor data, from the one or more sensors connected to the set top box [100]. The sensor data provides an information related to at least one of at least one activity performed by the one or more entities, one of a presence and an absence of the one or more entities in an area such as in the vicinity of the set top box [100] and the like information. In an example, the sensor data may include but not limited to a data received from at least one of a temperature sensor, a proximity sensor, an infrared sensor, a humidity sensor, a smart door lock sensor, a microphone sensor, a camera sensor, a smart bulb sensor, a smart AC sensor, a smart TV sensor, a smart remote control unit comprising various sensors, a motion sensor, a pressure sensor and the like sensors/sensor devices.

Also, the method encompasses receiving at the transceiver unit [106] of the set top box [100], the user data from the one or more user devices. The user data provides at least an information related to at least one of at least one activity performed by one or more users on the one or more user devices and an information collected by one or more sensors of the one or more user devices. Next, the method at step [304] comprises identifying, by an identification unit [102] of the set top box from the set of pre-stored contextual information, a target pre-stored contextual information associated with an entity, wherein said entity includes but not limited to at least one of a particular user and a particular IoT device associated with the one or more user devices connected to the set top box [100]. For example, if a set of pre-stored contextual information encompasses a contextual information of 8 users, then the method encompasses identifying by the identification unit [106], a target contextual information from the contextual information of said 8 users, wherein such target contextual information is associated with one of a specific user from the 8 users.

Also, the target contextual information comprises at least one of a usage preference associated with the entity and a pattern of usage associated with the entity. The method comprises identifying by the identification unit [102], the pattern of usage associated with the entity based on an identification of the entity, wherein the identification of the entity is based on the sensor data, a data received from a user device associated with the entity and a data associated with a pre-stored profile associated with the entity. For example, if a set of pre-stored contextual information comprising a contextual information of 10 entities is received at the set top box [100] via the transceiver unit [106], in such scenario the method encompasses identifying by the identification unit [102], an entity from the 10 entities (i.e. at least one of a specific user and a specific IoT device from the 10 entities) based on at least one of a sensor data associated with the entity, a data received from a user device associated with the entity and a data associated with a pre-stored profile associated with the entity. Once the entity from the 10 entities is identified, a contextual information of said entity (i.e. the target contextual information) is identified from the set of pre-stored contextual information comprising the contextual information of 10 entities. Furthermore, the contextual information of said entity (i.e. the target contextual information) is identified based on identifying by the identification unit [102], a pattern of usage associated with said entity. In an instance, said pattern of usage may be identified as a pattern followed by said entity to perform certain tasks, for example if said entity initiates a streaming of a live event at 5:00 PM daily, then the pattern of usage may indicate such initiation of streaming of said live event around 5:00 PM daily by said entity.

Next, at step [306] the method comprises identifying, by the identification unit [102] of the set top box [100], the usage preference associated with the entity based on the target pre-stored contextual information. In an implementation, the usage preference associated with the entity (i.e. at least one of the particular user and the particular IoT device) may include but not limited to a specific program/event/live stream/digital content preferred by the entity. Considering the above example where the entity initiates a streaming of a live event at 5:00 PM daily, in the given example, the method encompasses identifying by the identification unit [102] said live event as a usage preference as said live event is preferred by the entity.

Further, at step [308] the method comprises identifying, by the identification unit [102] of the set top box [100], one of a presence and an absence of the entity (i.e. at least one of the particular user and the particular IoT device) in the vicinity of the set top box based on the target pre-stored contextual information and a sensor data. The vicinity of the set top box may refer to a surrounding area of a specific area where the set top box [100] and/or a display device such as TV connected to the set top box [100] is placed. More specifically, the vicinity of the set top box [100] may be an area up to which the set top box [100] and/or the display device connected to the set top box [100] is clearly visible/accessible to the entity to access a program/event/live stream/digital content via the set top box [100]. Also in an example, if a target contextual information of a user 1 is identified and a sensor data is received, the method encompasses identifying by the identification unit [102], one of a presence and an absence of the user 1 in the vicinity of a set top box [100] based on the target contextual information of the user 1 and the sensor data. More particularly, if the target contextual information of the user 1 indicates that the user 1 in between 2:00 PM to 4:00 PM usually present in an area surrounding the set top box [100], and the sensor data from one or more sensors indicates more than one users are present in said room between 2:00 PM to 4:00 PM, the method via the identification unit [102] in such instance identifies one of the presence and the absence of the user 1 in area room based on the target contextual information of the user 1 and the sensor data of various sensors.

The method further comprises detecting by the processing unit [104], a streaming time of a preferred event based on the usage preference associated with the entity. More particularly, the method encompasses detecting by the processing unit [104] whether a current time is a time of streaming of the preferred event identified based on the usage preference associated with the entity. Once the presence or the absence of the entity (i.e. at least one of the particular user and the particular IoT device) in the vicinity of the set top box [100] is identified, the method leads to detecting by the processing unit [104], a streaming time of an event preferred by said entity based on the usage preference associated with the entity, to further detect whether a current time is a time of streaming of such preferred event. For example, if a particular person prefers to watch a TV show CBA at 2:00 PM on Monday, the method encompasses detecting by the processing unit [104], a streaming time of said TV show CBA i.e. 2:00 PM on Monday, to further detect whether a current time is a time of streaming of such preferred event (i.e. Monday, 2:00 PM).

Next, at step [310] the method comprises automatically controlling, by the processing unit [104] of the set top box [100], the mode on the set top box [100] based on the usage preference associated with the entity and one of the presence and the absence of the entity in the vicinity of the set top box [100]. More particularly, the method encompasses automatically controlling by the processing unit [104], the mode on the set top box [100] based on the detected streaming time of the preferred event associated with the entity and one of the presence and the absence of the entity in the vicinity of the set top box.

Furthermore, the process of controlling, by the processing unit [104], the mode on the set top box [100] further comprises one of an automatically disabling the standby mode on the set top box [100] based on a successful detection of the streaming time of the preferred event and the presence of the entity in the vicinity of the set top box [100], an automatically disabling the standby mode on the set top box [100] based on the successful detection of the streaming time of the preferred event and the absence of the entity in the vicinity of the set top box [100], an automatically enabling the standby mode on the set top box [100] based on an unsuccessful detection of the streaming time of the preferred event and the presence of the entity in the vicinity of the set top box [100], and an automatically enabling the standby mode on the set top box [100] based on the unsuccessful detection of the streaming time of the preferred event and the absence of the entity in the vicinity of the set top box [100].

Also, the process of automatically enabling the standby mode on the set top box [100] based on the unsuccessful detection of the streaming time of the preferred event and the presence of the entity in the vicinity of the set top box [100] is further based on a detection of a power off state of a TV connected to the set top box [100]. More particularly, in the given scenario, a power on/off state of the TV connected to the set top box [100] is determined to identify an event where the entity is currently watching/accessing any program/media content/digital event/live event over the TV via the set top box [100] (i.e. the case the TV is in Power on state), in order to further disable the standby mode on the set top box [100] or to keep the set top box [100] in on state; OR the power on/off state of the TV connected to the set top box [100] is determined to identify an event where the entity currently not watching/accessing any program/media content/digital event/live event over the TV via the set top box [100] (i.e. the case the TV is in Power Off state), in order to further enable the standby mode on the set top box [100]. Also, in an implementation the process of automatically enabling the standby mode on the set top box [100] based on the unsuccessful detection of the streaming time of the preferred event and the presence of the entity in the vicinity of the set top box [100] is further based on a detection of an ongoing display of a digital content on the TV via an input source other than the set top box. More particularly, in the given scenario, the ongoing display of the digital content on the TV via the input source other than the set top box [100] is determined to identify an event where the entity is currently watching/accessing the digital content over the TV via the input source other than the set top box [100], in order to further enable the standby mode on the set top box [100] or to keep the set top box [100] in the standby state. Also, in an implementation the input source other than the set top box [100] may include but not limited to a smart speaker, a smartphone, a smart TV, a USB device or any such similar device having a capability to provide as an input source the digital content(s) over the TV.

Therefore, in an example, the method via the processing unit [104] will perform the function of automatically disabling the standby mode on the set top box [100], if a particular user A is identified in the vicinity of the set top box [100] and if a current time is a streaming time of an event preferred by said particular user A. In the given example, the standby mode on the set top box [100] is disabled to automatically display said preferred event associated with user A via one or more display devices such as a TV connected to the set top box [100].

Also, in an example, the method via the processing unit [104] will perform the function of automatically disabling the standby mode on the set top box [100], if a particular user A is not identified in the vicinity of the set top box [100] and if a current time is a streaming time of an event preferred by said particular user A. In the given example, the standby mode on the set top box [100] is disabled to automatically record said preferred event associated with user A via the set top box [100].

Further, in an example, the method via the processing unit [104] will perform the function of automatically enabling the standby mode on the set top box [100], if a particular user A is identified in the vicinity of the set top box [100] and if a current time is not the streaming time of an event preferred by said particular user A. Also, said function of automatically enabling the standby mode on the set top box [100] based on the unsuccessful detection of the streaming time (i.e. the current time as the streaming time) of the preferred event and the presence of the particular user A in the vicinity of the set top box [100] is further based on a detection of a power off state of a TV connected to the set top box [100]. The power off state of the TV connected to the set top box [100] is determined to further identify that the particular user A is currently not watching/accessing any program/media content/digital event/live event over the TV via the set top box [100].

Also, in an example, the method via the processing unit [104] will perform the function of automatically enabling the standby mode on the set top box [100], if a particular user A is not identified in the vicinity of the set top box [100] and if a current time is not the streaming time of an event preferred by said particular user A.

The method thereafter terminates at step [312].

Figure 4:
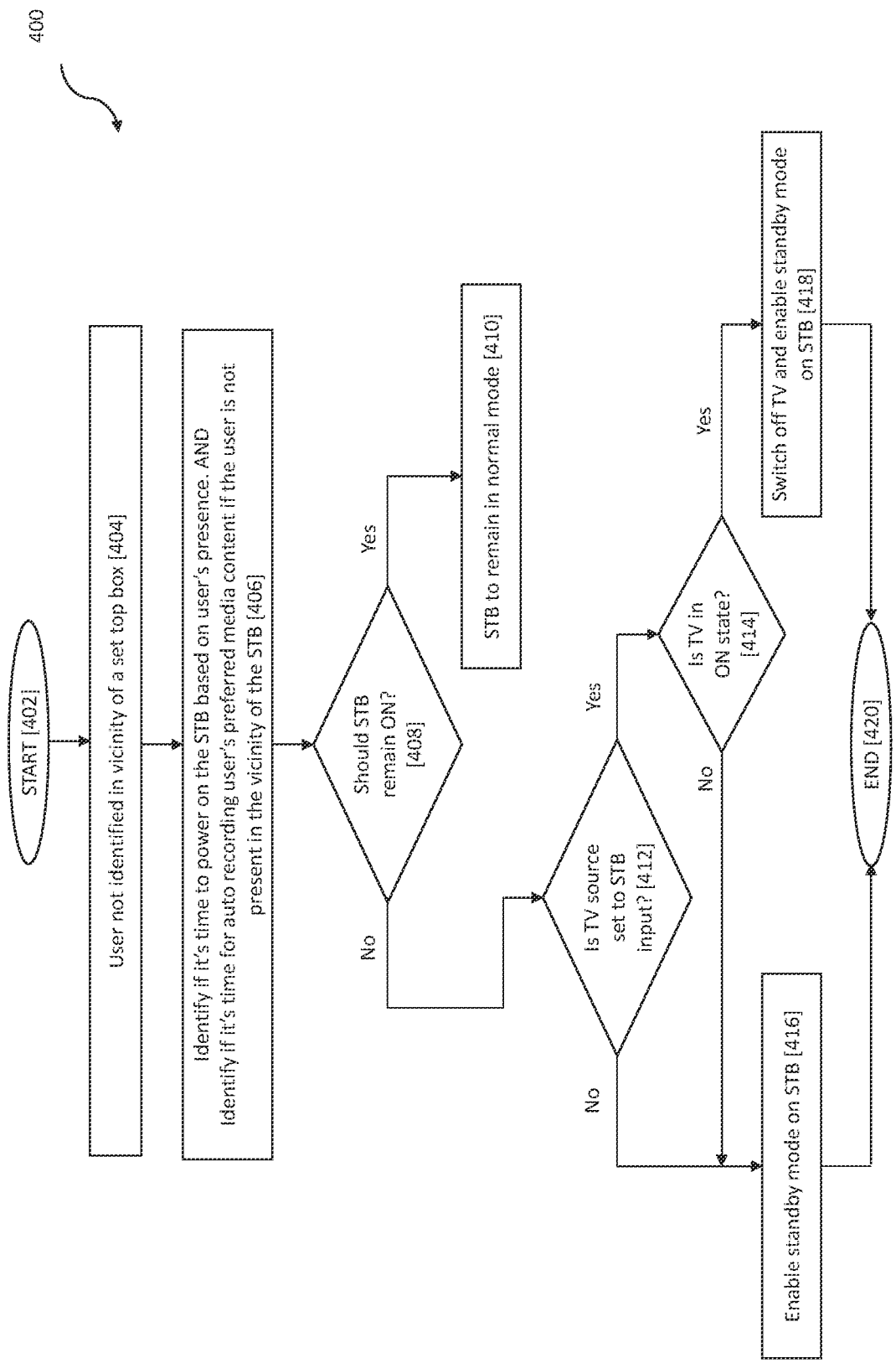
FIG. 4 illustrates an exemplary flow diagram, depicting an instance implementation of an exemplary process of automatically controlling a standby mode on a set top box, in accordance with exemplary embodiments of the present invention.

Referring to FIG. 4, an exemplary flow diagram, depicting an instance implementation of an exemplary process of automatically controlling a standby mode on a set top box [100], in accordance with exemplary embodiments of the present invention is shown. As shown in FIG. 4, the method starts at step [402].

At step [404], an absence of a user is identified in vicinity of the set top box [100] based at least on a previous usage pattern (i.e. target contextual information) of said user and a sensor data.

Next, at step [406], the method encompasses detecting at least one of a probability of the user to watch a STB content within a pre-determined time, and a probability of the user preferred media (i.e. the STB content) to be played/recorded, based at least on the previous usage pattern of the user. More specifically, at step [406], the method encompasses identifying if a current time is the time to power on the STB [100]

based on the user's presence in the vicinity of the STB [100] to display the user's preferred media content (i.e. the STB content), or identifying if the current time is the time for auto recording of said user's preferred media content if the user is not present in the vicinity of the STB [100]. Also, in an event if the current time is not identified as the time of the user's preferred media content, in such event is a condition to activate a standby mode on STB [100] is achieved.

Further, if the condition to activate the standby mode on STB [100] is achieved, the method at step [408] encompasses identifying if the STB [100] should remain in an ON state. If it is identified that the STB [100] should remain in the ON state the method leads to step [410], otherwise the method leads to step [412]. At step [410], the method encompasses keeping the STB [100] in normal mode.

Next, at step [412], the method encompasses detecting if a W source is set to STB input. In case, the TV source is not set to the STB input, the method leads to step [416], otherwise the method leads to step [414]. At step [416], the method encompasses enabling the standby mode on the STB [100] and leads to step [420].

Next, at step [414], the method encompasses identifying if the TV is in ON state or if the TV is displaying a content from a source connected to the STB [100]. In case the TV is in ON state and the user is not present in the vicinity of the STB [100], the method leads to step [418], otherwise the method leads to step [416] and enables the standby mode on the STB [100].

Next, at step [418], the method encompasses, switching off the TV and enabling the standby mode on the STB [100]. Thereafter, the method leads to step [420].

The method further terminates at step [420].

Referring to FIG. 5, an exemplary flow diagram, depicting an instance implementation of an exemplary process of automatically controlling a standby mode on a set top box [100], in accordance with exemplary embodiments of the present invention is shown. As shown in FIG. 5, the method starts at step [502].

At step [504], a presence of a user A is identified in vicinity of the set top box [100] based at least on a previous usage pattern (i.e. target contextual information) of said user and a sensor data.

Next, at step [506], the method encompasses detecting at least one of a probability of the user A to watch a STB content within a pre-determined time, and a probability of the user A's preferred media (i.e. the STB content) to be played/recorded, based at least on the previous usage pattern of the user A. More specifically, at step [506], the method encompasses identifying if a current time is the time to power on the STB [100] based on the user A's presence in the vicinity of the STB [100] to display the user A's preferred media content (i.e. the STB content), or identifying if the current time is the time for auto recording of said user A's preferred media content if the user A is not present in the vicinity of the STB [100]. Also, in an event if the current time is not identified as the time of the user A's preferred media content, in such event is a condition to activate a standby mode on STB [100] is achieved.

Further, if the condition to activate the standby mode on STB [100] is achieved, the method at step [508] encompasses identifying if the STB [100] should remain in an ON state. If it is identified that the STB [100] should remain in the ON state the method leads to step [516], otherwise the method leads to step [510]. At step [516], the method encompasses keeping the STB [100] in normal mode.

Next, at step [510], the method encompasses detecting if a TV source is set to STB input. In case, the TV source is not set to the STB input, the method leads to step [514], otherwise the method leads to step [512]. At step [514], the method encompasses enabling the standby mode on the STB [100] and leads to step [518].

Next, at step [512], the method encompasses identifying if the TV is in ON state or if the TV is displaying a content from a source connected to the STB [100]. In case the TV is in ON state and the user is present in the vicinity of the STB [100], the method leads to step [516], otherwise the method leads to step [514] and enables the standby mode on the STB [100].

At step [516], the method encompasses, keeping the STB [100] in normal mode to let the STB [100] continue playing a media content on the TV as long as the user A is present in the room. Thereafter, the method leads to step [518].

The method further terminates at step [518].

As is evident from the above disclosure, the present invention provides a novel solution for automatically controlling a mode on a set top box. The present invention enables a set top box to automatically control it's mode(s) irrespective of an initial mode/state of said set top box such as a Power on state, Power Off state, Standby state or low power state etc. The solution as disclosed in the present invention provides a technical effect of seamless automatic transition of the set top box from a current working mode/state to other mode/state based on a usage preference associated with an entity and one of a presence and an absence of said entity in the vicinity of the set top box.

Further, the systems/units depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home/building and may include network devices located outside of the user's home/building. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for automatically controlling a mode on a set top box, the method comprising:
    identifying, by an identification unit of the set top box from a set of pre-stored contextual information, a target pre-stored contextual information associated with an entity;
    identifying, by the identification unit of the set top box, a usage preference associated with the entity based on the target pre-stored contextual information;
    identifying, by the identification unit of the set top box, one of a presence and an absence of the entity in the vicinity of the set top box based on the target pre-stored contextual information and sensor data;
    detecting, by a processing unit of the set top box, a streaming time of a preferred event based on the usage preference associated with the entity; and
    automatically controlling, by the processing unit of the set top box, the mode on the set top box based on the detected streaming time of the preferred event and one of the presence and the absence of the entity in the vicinity of the set top box, wherein the mode is one of a standby mode, a sleep mode, a Power off mode, a Power on mode and a low Power mode, wherein the step of automatically controlling the mode comprises:
    automatically disabling the standby mode on the set top box based on a successful detection of the streaming time of the preferred event and one of the presence and the absence of the entity in the vicinity of the set top box; and
    automatically enabling the standby mode on the set top box based on an unsuccessful detection of the streaming time of the preferred event and one of the presence and the absence of the entity in the vicinity of the set top box.

2. The method as claimed in claim 1, the method comprises receiving at a transceiver unit of the set top box:
    the sensor data, from one or more sensors connected to the set top box, and
    the set of pre-stored contextual information, from one or more storage units connected to the set top box, wherein:
    the set of pre-stored contextual information comprises at least one of a pattern of usage associated with a set of entities and a usage preference associated with the set of entities, and
    the set of pre-stored contextual information is generated at the one or more storage units based at least on the sensor data received at the one or more storage units using one or more Artificial Intelligence (AI) techniques.

3. The method as claimed in claim 1, wherein the entity comprises at least one of a particular user and a particular IoT device associated with one or more user devices connected to the set top box.

4. The method as claimed in claim 1, wherein the target contextual information further comprises at least one of the usage preference associated with the entity and a pattern of usage associated with the entity.

5. The method as claimed in claim 1, the method comprises identifying by the identification unit, the pattern of usage associated with the entity based on an identification of the entity, wherein the identification of the entity is based on at least one of the sensor data, a data received from a user device associated with the entity and a data associated with a pre-stored profile associated with the entity.

6. The method as claimed in claim 1, wherein automatically enabling the standby mode on the set top box based on the unsuccessful detection of the streaming time of the preferred event and the presence of the entity in the vicinity of the set top box is further based on a detection of a power off state of a TV connected to the set top box.

7. The method as claimed in claim 1, wherein automatically enabling the standby mode on the set top box based on the unsuccessful detection of the streaming time of the preferred event and the presence of the entity in the vicinity of the set top box is further based on a detection of an ongoing display of a digital content on the TV via an input source other than the set top box.

8. A system for automatically controlling a mode on a set top box, the system comprising:
    an identification unit, configured to:
        identify, from a set of pre-stored contextual information, a target pre-stored contextual information associated with an entity,
        identify, a usage preference associated with the entity based on the target prestored contextual information, and
        identify, one of a presence and an absence of the entity in the vicinity of the set top box based on the target pre-stored contextual information and sensor data; and
    a processing unit, configured to:
        detect a streaming time of a preferred event based on the usage preference associated with the entity;
        automatically control, the mode on the set top box based on the detected streaming time of the preferred event and one of the presence and the absence of the entity in the vicinity of the set top box, wherein the mode is one of a standby mode, a sleep mode, a Power off mode, a Power on mode and a low Power mode, wherein the step of automatically controlling the mode comprises:
automatically disabling the standby mode on the set top box based on a successful detection of the streaming time of the preferred event and one of the presence and the absence of the entity in the vicinity of the set top box; and
automatically enabling the standby mode on the set top box based on an unsuccessful detection of the streaming time of the preferred event and one of the presence and the absence of the entity in the vicinity of the set top box.

9. The system as claimed in claim 8, the system comprises a transceiver unit configured to:
receive, the sensor data, from one or more sensors connected to the system, and
receive, the set of pre-stored contextual information, from one or more storage units connected to the system, wherein:
the set of pre-stored contextual information comprises at least one of a pattern of usage associated with a set of entities and a usage preference associated with the set of entities, and
the set of pre-stored contextual information is generated at the one or more storage units based at least on the sensor data received at the one or more storage units using one or more Artificial Intelligence (AI) techniques.

10. The system as claimed in claim 8, wherein the entity comprises at least one of a particular user and a particular IoT device associated with one or more user devices connected to the system.

11. The system as claimed in claim 8, wherein the target contextual information further comprises at least one of the usage preference associated with the entity and a pattern of usage associated with the entity.

12. The system as claimed in claim 8, wherein the identification unit is further configured to identify, the pattern of usage associated with the entity based on an identification of the entity, wherein the identification of the entity is based on at least one of the sensor data, a data received from a user device associated with the entity and a data associated with a pre-stored profile associated with the entity.

13. The system as claimed in claim 8, wherein automatically enabling the standby mode on the set top box based on the unsuccessful detection of the streaming time of the preferred event and the presence of the entity in the vicinity of the set top box is further based on a detection of a power off state of a TV connected to the set top box.

14. The system as claimed in claim 8, wherein automatically enabling the standby mode on the set top box based on the unsuccessful detection of the streaming time of the preferred event and the presence of the entity in the vicinity of the set top box is further based on a detection of an ongoing display of a digital content on the TV via an input source other than the set top box.

* * * * *